United States Patent [19]
Hasegawa et al.

[11] 3,836,922
[45] Sept. 17, 1974

[54] EXPOSURE SETTING DEVICE FOR FLASH PHOTOGRAPHING

[75] Inventors: Goro Hasegawa; Soichi Nakamoto; Yoshiyuki Takishima; Yukio Mashimo; Tatsuya Taguchi, all of Tokyo; Zenzo Nakamura, Saitama; Tetsuya Taguchi, Kanagawa, all of Japan

[73] Assignee: Canon Kabushiki Kaisha, Tokyo, Japan

[22] Filed: June 11, 1973

[21] Appl. No.: 368,468

[30] Foreign Application Priority Data
June 15, 1972   Japan.............................. 47-59686

[52] U.S. Cl. ............................................... 354/51
[51] Int. Cl. .......................................... G03b 7/08
[58] Field of Search ........ 95/10 CT; 354/27, 29, 30, 354/50, 51

[56] References Cited
UNITED STATES PATENTS

3,675,547   7/1972   Uchiyama et al........................ 95/10
3,731,603   5/1973   Ono et al................................. 95/10

*Primary Examiner*—Samuel S. Matthews
*Assistant Examiner*—Michael L. Gellner
*Attorney, Agent, or Firm*—Toren, McGeady and Stanger

[57] ABSTRACT

In the apparatus disclosed, a camera includes facilities for providing electrical values corresponding to the diaphragm opening, film sensitivity, ambient measured light, and object focusing distance. When the camera is set in its available-light photography mode, an operating circuit utilizes the electrical values for diaphragm openings, film sensitivity, and ambient light to time a shutter. In the flash mode, the operating circuit combines the electrical values of the flash power with the film sensitivity and object focusing distance to adjust the required diaphragm opening while timing the shutter for a preset timing interval.

12 Claims, 7 Drawing Figures

PATENTED SEP 17 1974 3,836,922

EXPOSURE SETTING DEVICE FOR FLASH PHOTOGRAPHING

The present invention relates to a flash photographing device, particularly to a flash photographing device in which a memory device is provided and flash photographing exposure value for a camera, such as a distance to an object and a diaphragm value, etc. is set by the indication of an indication device which indicates values memorized in the above mentioned memory device.

Heretofore, an electronic shutter circuit in a single lens reflex camera has been proposed, in which brightness information of an object is measured by a light receiving element such as $CdS$, etc. and such exposure factors as film sensitivity and diaphragm value, etc. are operated along with said brightness information and are memorized in a memory device such as a capacitor, etc., and shutter speed is set based on said memorized value.

However, in a camera having such a shutter circuit as mentioned above, in order to perform photographing with auxiliary light using a flashing device, that is a stroboscope device or a flash device, etc. built in a camera or attached thereto, the distance to an object and the diaphragm value must be set corresponding to the guide number of a flashing device used based on a calculation formula, thus the exposure must be set based on a quite complicated method in flash photographing even though the camera has an electronic shutter circuit very effective for ordinary daylight photographing.

The object of the present invention is to provide an exposure setting device which allows appropriate exposure setting both in daylight photographing and in flash photographing, and is characterized by that a control circuit which determines the exposure in daylight photographing is also used in flash photographing, and the operated information is memorized in a memory device then the exposure valve is determined based on said memorized value.

Now, concrete examples of the present invention shall be explained referring to the drawings.

Figure 1:
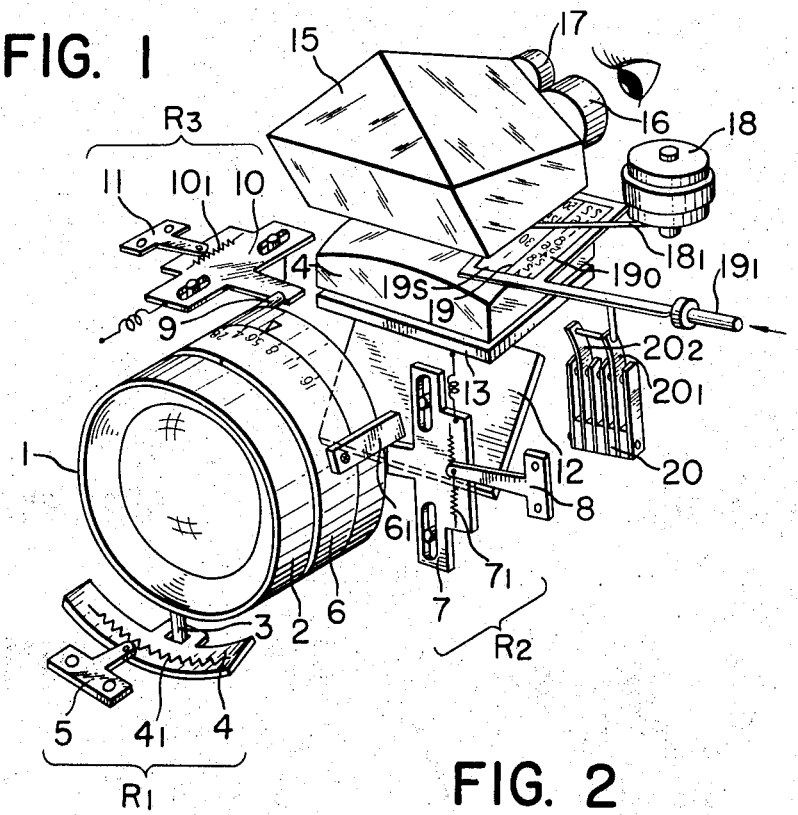
FIG. 1 is a principal arrangement drawing of a camera to which the flash photographing exposure setting device of the present invention is applied.

FIG. 1 shows an arrangement of important parts of the mechanism at camera side when the present invention is applied to a single lens reflex camera, and in the drawing, 1 is an exchange lens having a preset diaphragm device to be mounted in an exchangeable manner to a camera, 2 is a distance setting ring of the lens 1. 3 is a pin planted on the ring 2. 4 is a carrier ring for a variable resistor $4_1$ positioned within a ring which is not shown in the drawing in a freely rotatable manner, and said ring not shown in the drawing is mounted on a fixed frame of the lens 1 or to a camera main body. 5 is a sliding piece which is fixed on the ring not shown in the drawing in an electrically insulated manner. 6 is a diaphragm preset ring, $6_1$ is a transmitting member provided on the ring 6. 7 is a sliding member provided at a camera side, and $7_1$ is a resistance unit provided on the sliding member 7 through an insulating base plate which is not shown in the drawing. 8 is a sliding piece provided on a fixed frame at a camera side being electrically insulated. 9 is a signal pin to transmit the relative maximum aperture signal of the lens to the camera side. 10 is a carrier member for a resistance unit $10_1$, having its position shifted by the signal pin 9. 11 shows a sliding piece. 12, 13, 14, 15, 16 show a reflective mirror, a condensor lens of a focus plate, a pentagonal prism, an eyepiece, respectively of a conventional single lens reflex camera, a light receiving element 17 of $CdS$, etc. is provided along with the eyepiece 16.

A pointer $18_1$ and a scale plate 19 of a meter 18 is provided between the pentagonal prism 15 and the condensor lens 14, and in the scale plate 19 a daylight photographing shutter scale 19S and a flash photographing diaphragm scale 19D are provided along with each other. 20 is a change over switch which presses an operating member $19_1$ of the scale plate 19 and changes over the same at the time of flash photographing, and each of the movable contacts $20_1$, $20_2$ is shifted in an association with said change over, thus the switch is changed over.

Figure 3:
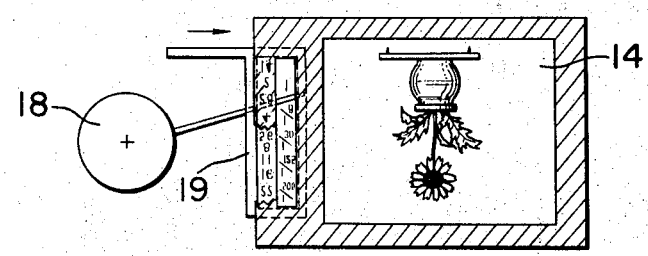
FIG. 3 is a front elevation of a finder of a camera shown in FIG. 1.

FIG. 3 shows a state as the scale plate 20 is seen from the reflective mirror 12 side.

Figure 2:
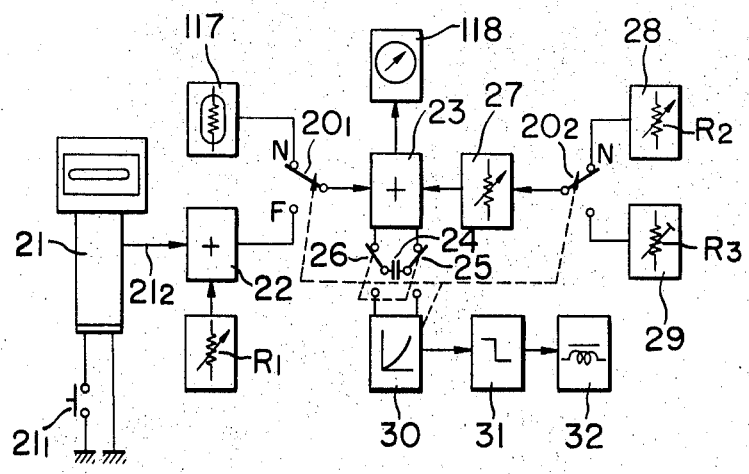
FIG. 2 is an arrangement block diagram of the flash photographing exposure setting device of the present invention.

FIG. 2 shows an example of the exposure control device according to the present invention used along with the mechanism shown in FIG. 1, and in the drawing, 21 is a stroboscope device, $21_1$ shows an outline of a synchronizing contact of a camera shutter. $21_2$ is guide number information output which outputs the voltage value which is a bleeder voltage of a light-emitter condensor within the stroboscope device 21. $R_1$ is a variable resistor consisting of a resistor $4_1$ and a sliding piece 5 and having such resistance value as corresponding to the distance to an object. 22 is an addition circuit and is to add the output voltage from a guide number signal output $21_2$ in the flash device 21 to the voltage generated by the variable resistor $R_1$. 23 is an operation circuit being connected to the addition circuit 22. 24 is a memory condensor. 25, 26 are memory switches which are changed over in an association with each other. 27 is an operation circuit, which sets such voltage as generated by a variable resistor not shown in the drawing corresponding to the film sensitivity, and at the same time adding the electric output which is impressed selectively through a change over switch $20_2$ and put into the operation circuit 23, said output being sent from a diaphragm value information setting circuit 28 generated by a variable resistor $R_2$ consisting of a sliding piece 8 and a resistor $7_1$ and being varied in association with the preset diaphragm ring, and by a circuit 29 which sets the full-open F value by $R_3$ consisting of a resistor $10_1$ having its resistance value set by the full-open F value and of a sliding piece 11.

30 is a well known type of a time limit circuit having its time limit controlled by the output of a memory device. 32 is a shutter closing magnet, and 31 shows a switching circuit for a driving magnet.

In the above arrangement, when the distance to an object and the full-open F value are set at each of the resistor $R_1$ and resistor $R_3$ at a camera side, further ASA information is set at the circuit 27, the electric output of each nformation setting circuit is impressed to the operation output 23.

In case of daylight photographing, the operating button $19_1$ is not pressed, therefore the change over switches $20_1$, $20_2$ are not changed over and are left connected to N side.

In this state the object brightness information is put in from CdS to the operation circuit 23, and such voltage value as corresponding to the shutter time signal which corresponds to the diaphragm value set by the preset ring 6 is charged across the memory condensor 24. Next, by pressing a release button not shown in the drawing, the mirror 12 goes up and shields the light from an object to the CdS17. At this time the memory switch is changed over to the time limit circuit 30 side in association with the mirror 12, and a time limit action is done based on the voltage value charged across the condensor 24. After an elapse of a prescribed period of time, the closing action of the shutter is done by the magnet 32 thus daylight photographing is completed.

Next for conducting flash photographing, the operation button $19_1$ is pressed. As a result the switch 20 is changed over and the movable contacts $20_1$, $20_2$ are changed over to F-side.

At this time since the guide number information of the flash device 21 is impressed to the operation circuit 23 through the addition circuit 22, the full-open F value of the exchange lens 1 and the results of operation of the distance to an object, the illumination guide number of the flash device are impressed to the memory condensor 24 and the meter 18 by the operation circuit 23.

The indication of the pointer of the meter 18 will show the preset diaphragm value which is indicated by the diaphragm scale 19D of the scale plate 19, and by setting the preset ring 6 according to the indication of the meter 18, a diaphragm value F satisfying GN = F.D (wherein GN: guide number, F: diaphragm value, D:distance to an object) by the operation circuit 23 will be set.

In this case, while the resistance $R_2$ is set by the preset ring 6, there will be no difficulties as the change over switch $20_2$ is not connected.

Next as a release button not shown in the drawing is pressed, the shutter is opened and at the same time the synchronizing contact $21_1$ is closed, then the flash device 21 flashes emitting light. In this case, concerning the exposure time, the change over switch within the time limit circuit is changed over in association with the change over of the switch 20, and the time limit circuit 30 is so changed over that the signal from the memory condensor is shielded and the shutter is opened and closed in a prescribed period of time, for example, 1/30 second.

While in the above example the results by the operation circuit 23 are memorized in the memory condensor 24 and said memorized results are indicated by the meter 18, then the preset diaphragm ring is manually set according to said indication, when a well known EE mechanism is provided, that is, a known scanning mechanism is provided at the meter pointer $18_1$ and said scanning mechanism and the preset diaphragm ring are connected in an associated relationship, thereby the diaphragm value is automatically set corresponding to the swing position of the pointer $18_1$, the diaphragm value will be automatically set. Further, in order to secure a prescribed time limit of with the time limit circuit 30 so that the shutter time will be a prescribed length of time for example 1/30 second when the change over switches $20_1$, $20_2$ are changed over as described above then the memory condensor 24 as a memory device and the time limit circuit 30 are changed over, a time constant circuit with a time contant of 1/30 second may be used.

Figure 4:
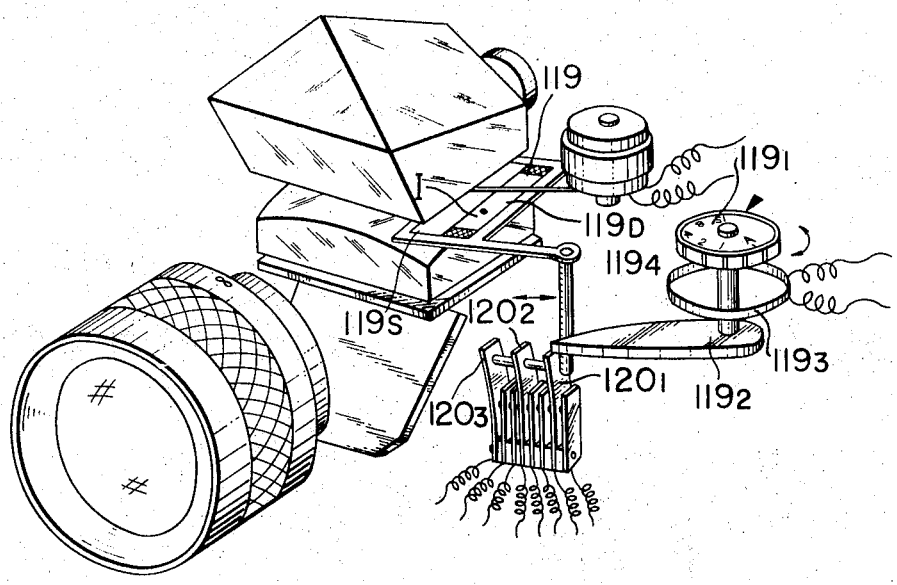
FIG. 4 is a principal arrangement drawing of a camera to which another example of the exposure setting device according to the present invention is applied.

FIG 4 to FIG. 7 show other examples of the present invention, and FIG. 4 shows the important parts of the mechanism applied to said examples, and what is different from the mechanism arrangement shown in FIG. 1 is that a shutter time setting dial is used with a change over operation dial $119_1$ are used in stead of the operation button 19, and by the operation at the time of flash photographing a scale plate 119 is shifted through a shifting pin $119_4$ of the scale plate 119 by a forward end cam part of a cam lever $119_2$ provided on a rotating shaft of the above mentioned dial, then the diaphragm scale part 119D is inserted between the condensor lens of a finder system and a pentagonal prism. The diaphragm indication part of the scale part 19D has a fixed mark I only provided thereon and different from the above example, and the setting of diaphragm is done in such a manner that the preset diaphragm ring is rotated as will be explained below so that the pointer matches with said mark, thus proper diaphragm value is set.

Also a variable resistor $119_3$ provided co-axially with the dial $119_1$ is set in an association movement, thus it is set to the prescribed resistance value.

When the dial is matched to the position "A," a daylight photographing state is secured, while flash photographing state is secured as $(\eta)$ mark is set to the mark, and manual time setting state is secured as the $\alpha$ mark on the dial is matched with said mark. When the $(\eta)$ mark is set, the change over switch 120 is changed over and at the same time the resistance value of the resistor. $119_3$ is so set together with the time limit condensor to be described below in such a manner that the time constant thereof will be set to 1/30 second, and when the dial is set to a prescribed manual time, the resistor $119_3$ is set to an appropriate resistance value.

Figure 5:
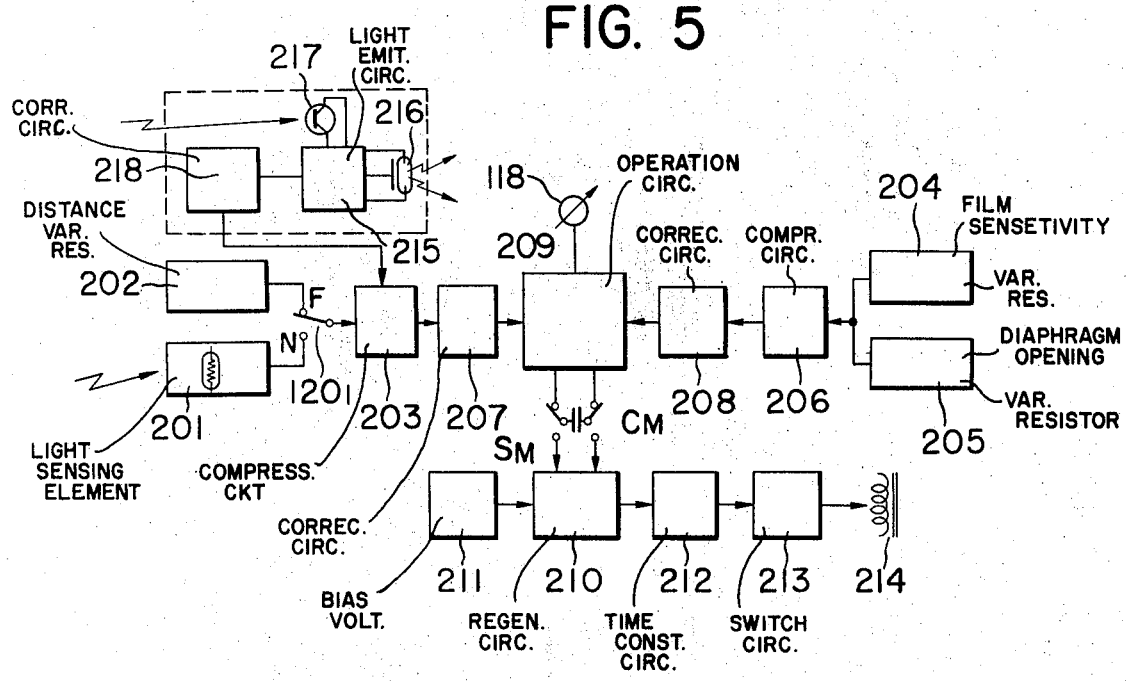
FIG. 5 is an arrangement block diagram of another example of the flash photographing exposure setting device according to the present invention.

FIG. 5 shows an electric circuit block diagram which can be applied to the device shown in FIG. 4. In this drawing, 201 is a light sensing element to which a light receiving element, CdS, etc. is connected, 202 is a distance variable resistor which is variable in association with an object distance setting ring, and 203 is a compression circuit having its input selectively connected to the light sensing element 201 or the distance resistor 201 through a change over switch $120_1$ and outputting voltage which is compressed against the current value flowing to the light sensing element or the variable resistance that is the variation in the resistance value. 204, 205 are variable resistance elements to set film sensitivity, diaphragm information, respectively, and 206 is a compression circuit which is equivalent to the compression circuit 203. 207, 208 are correction circuit to have the $\gamma$ value of the CdS used as the light sensing element 201 match with the $\gamma$ value of each of the variable resistors 202, 204, 205, that is the resistance value characteristics presented against the set value. 209 is a comparative operation circuit composed of a differential amplifier, etc. CM is a memory condensor connected to the output of the operation circuit 209 through a memory switch SM. 21 is a regeneration circuit to form the output current elongated against the input voltage thereto. 211 is a bias voltage circuit which impresses a constant bias voltage to the regeneration circuit 210 by such circuit arrangement as equivalent to the regeneration circuit 210, and at the same time makes the bias voltage of the regeneration circuit 210 variable against the temperature variation so that a constant output is always obtained. 212 is a time constant circuit having a condensor to charge the output current of the regeneration circuit 210. 213 is a transistor switching circuit to actuate with its output an electro-magnet 214 which controls a shutter closing device.

215 shows a light emitting circuit, and 216 is a xenon discharge tube connected to the output of the light emitting circuit 215. 217 is a light receiving element such as CdS, etc. to receive the light of the flash illumination reflected from an object. 218 is a correction circuit.

Figure 6:
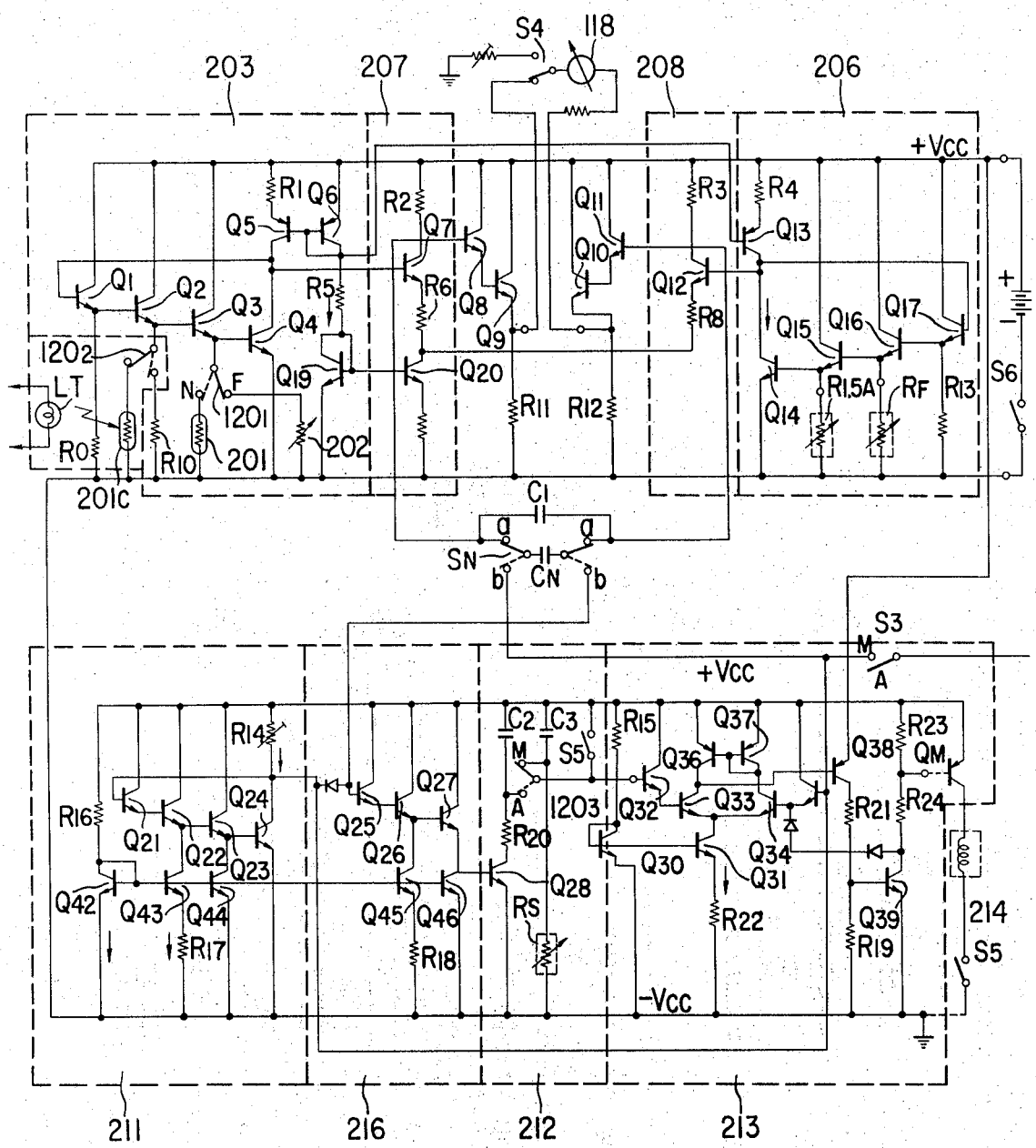
FIG. 6 is a concrete circuit diagram of the block diagram shown in FIG. 5.

FIG. 6 shows a concrete circuit arrangement of the circuit block shown in FIG. 5. In FIG. 6, the compression circuits 203 and 206 have a negative feedback circuits being connected between the input and the output of an emitter direct coupled amplification circuit of transistors $Q_1$, $Q_2$, $Q_3$, $Q_4$ and transistors $Q_{17}$, $Q_{16}$, $Q_{15}$, $Q_{14}$, that is between the bases of the transistors $Q_1$, $Q_{17}$ and the collectors of the transistors $Q_4$ and $Q_{14}$, respectively. A light receiving element 201 and an ASA sensitivity setting variable resistor 205 are connected to a negative feedback directly coupled amplification circuit, and logarithmically compresses the resistance variation of the light receiving element 201 by receiving the light from an object or the resistance variation of the variable resistor 205 by setting ASA sensitivity and impresses the same to the base of the $\gamma$ correction transistors $Q_7$, $Q_{12}$. The output voltage of the output transistors $Q_4$, $Q_{14}$ of the compression circuit forms compressed voltage value and is put into the $\gamma$ correction circuit transistor. On the other hand, the operation circuit is composed of a comparative amplification circuit consisting of the transistors $Q_8$, $Q_9$, $Q_{11}$, $Q_{10}$. The memory condensor CM is connected between the collectors of transistor $Q_7$ and the transistor $Q_{12}$, and a meter 118 is connected between the emitters of the transistors $Q_8$, $Q_{10}$ in the operation circuit. The regeneration circuit 210 consists of the transistors $Q_{25}$, $Q_{26}$, $Q_{27}$ of Darlington connection, and at the same time impresses the bias voltage from the bias circuit 211. The transistors $Q_{43}$, $Q_{44}$, $Q_{45}$, $Q_{46}$ for a constant current circuit are connected within the bias circuit 211 and the regeneration circuit 210. The time limit circuit 212 changes over the time limit condensors $C_2$, $C_3$ by a change over switch $120_3$, and at the time of flash photographing, the time limit function is performed for such time constant duration of time as determined by the resistance RS of a resistor $119_3$ on a dial 119 and the condensor $C_3$ irrespective to the memorized value of the memory condensor $C_3$, for example 1/30 second.

$S_2$ is a short-circuiting switch which is open at the time of the opening action of the shutter and is closed after the opening and closing action of the shutter. The switching circuit 213 consists of a differential circuit having transistors $Q_{32}$ to $Q_{37}$, and is connected in such manner as controlling the magnet 214 through the switching transistors $Q_{32}$, $Q_{29}$, $Q_M$.

Figure 7:
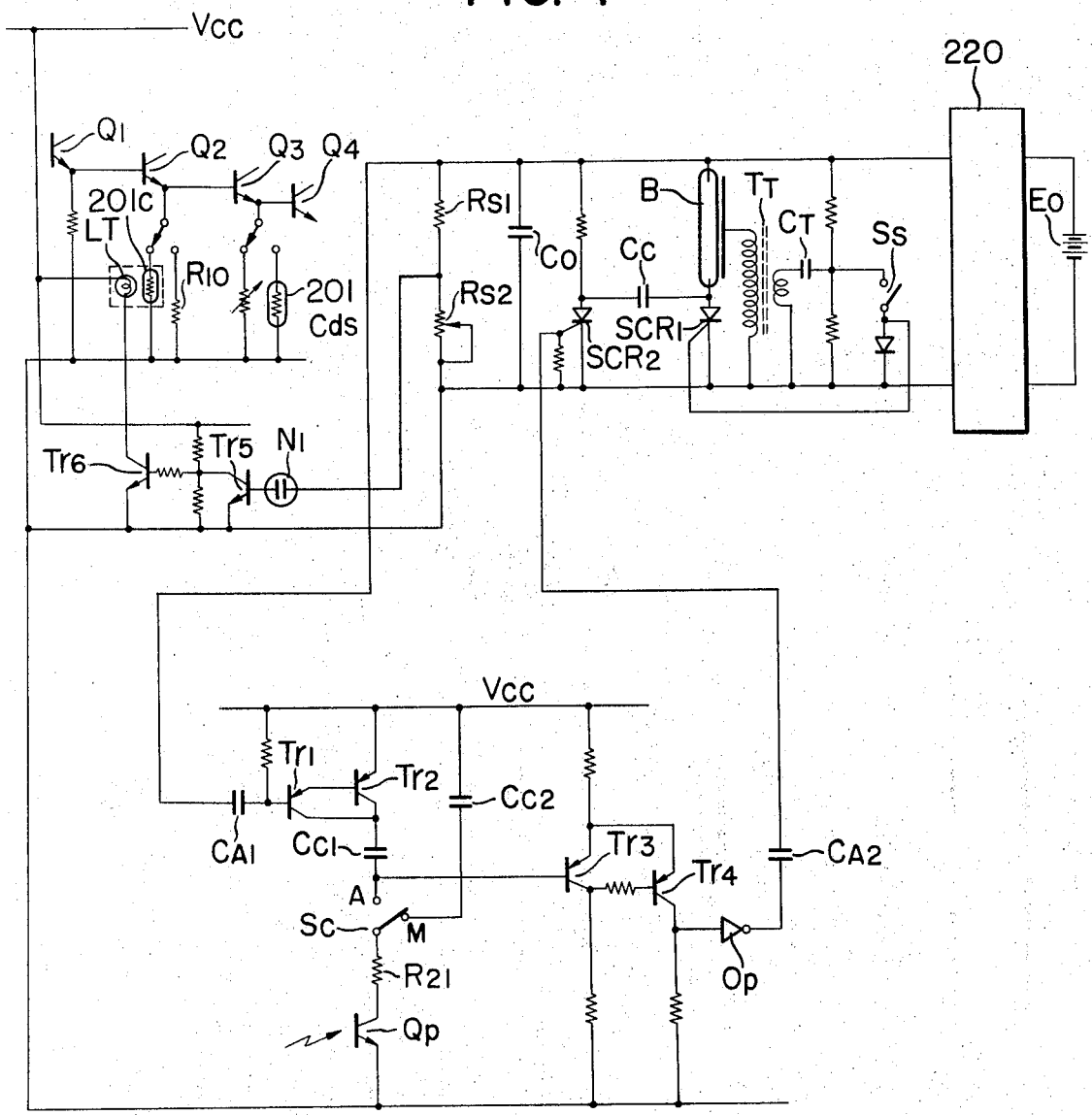
FIG. 7 is another example of a concrete circuit diagram of the block diagram shown in FIG. 5.

Concrete arrangement of the light emitting circuit 215 of a flashing device and the correction circuit 218 is shown in FIG. 7. In this drawing, $E_o$ is a light emitting light source, 220 is a boosting DC—DC converter, $T_T$ is a trigger tansformer, $C_r$ is a trigger condensor, $S_t$ is a trigger switch being synchronized with the camera shutter, B is a xenon light emitting tube, $sCR_1$, $SCR_2$ are switching element for controlling emission of light, $C_c$ is a commutation condensor, $RS_1$, $RS_2$ are bleeder resistance, $Q_p$ is a photo-transistor, $C_{c1}$, $C_{c2}$ are operation condensor, $T_{r1}$, $T_{r2}$ are transistors of Darlington connection. $CA_1$ is a coupling condensor. The terminals of the condensors $C_{c1}$, $C_{c2}$ are connected selectively to the photo-transistor $Q_p$ through the change over switch SC. $T_{r4}$, $T_{r5}$ show a Schmitt circuit, $O_p$ is a phase reversal circuit, and $CA_2$ shows the coupling condensor. $N_2$ shows a neon tube, $T_{r5}$, $T_{r6}$ show switching transistor, and a lamp $L_T$ is connected in a collector circuit of the transistor $T_{r6}$ and is arranged in front of a photoconductive material optically coupled with the lamp $L_T$.

Operations based on the above arrangement shall be explained.

Automatic Daylight Photographing:

When the dial $119_1$ is set at the position "A" against the fixed mark the switches $120_1$ to $120_3$ are changed over to position N or position A (contact $120_3$). The resistance value of the photo-conductive element 201 changes logarithmically by the amount of light from an object and its range of variation is quite wide. While the gain of the compression circuit 203 changes with a quite wide range by said variation in the resistance value, said variation in the gain is compressed by using a feedback circuit in the 203. Also in the compression circuit 206, its gain becomes such value as corresponding to a set value by setting the diaphragm value, film sensitivity, etc. at the variable elements, $R_F$, $R_{ASA}$, and its gain variation range is also compressed by using a feedback circuit. By adjusting the compression characteristics of the above mentioned 2 and 4 the difference between the $\gamma$ of the photo-conductive element 201 and the $\gamma$ of the variable elements $R_F$, $R_{ASA}$ may be corrected. The output of the circuits 203 and 206 are added to the input to the differential amplification circuit through the circuits 207, 208, and such voltage as determined by the resistance value of the light receiving element and the photographing information is generated at the output of the same, then it is memorized in the memory condensor CM. That is such voltage as corresponding to the amount of light received by the photo-conductive element before shutter actuation is memorized in the condensor in such state that the switch SM is connected to a side.

Next as the switch SM is connected to b side by the shutter actuation is memorized voltage is added to the input of the regeneration circuit and the circuit 210. The 211 is a transistor circuit having same feedback circuit as in the compression circuit 203, 206 and controls in a stable manner the bias of the transistor amplification circuit of the regeneration circuit 210 by its compression characteristics. By this the transistor regeneration circuit of the circuit 210 works as an elongation circuit, thus its output resistance value will make such variation as equivalent to that of the resistance value made by the photo-conductive element before actuation of the shutter. The switching circuit 213 is actuated by such time as determined by the time limit circuit 212 by said resistance value and the condensor, and the electro-magnet 216 is driven by said switching action thus actuating the shutter closing member.

That is, first the power source switch $S_6$ is closed, then the resistance value of the photo-conductive element 201 will become a certain value by the light from an object and the output of the amplification circuit consisting of the transistors $Q_1$ to $Q_4$ will become such value as corresponding to the amount of light incident upon the light receiving element. As there is a feedback path between the collector of said transistor $Q_4$ and the base of the transistor $Q_1$, the variation of the resistance value corresponding to the amount of light incident upon the light receiving element will be compressed by the same. Also as there is a feedback path in the photographing information setting circuit consisting of the transistors $Q_{14}$ to $Q_{17}$, constituting similar amplification circuit to the same, the variation in the resistance value of the variable resistances $R_F$ and $R_{ASA}$ to set the film sensitivity and the diaphragm value will be similarly compressed. The output of these two circuits are added to the output stage transistors $Q_9$ and $Q_{10}$, respectively through the exciting stage transistors $Q_8$ and $Q_{11}$, and the ammeter 118 is made to swing thereby. By the indication of the same the shutter speed can be foreseen before the actuation of the shutter. The output of the exciting stage transistors $Q_8$ and $Q_{11}$ is connected to the memory condensor through the change over switch SM, charging the same to a certain level of terminal voltage. This memorized voltage is such value as corresponding to the resistance value of the photo-conductive element 201 and the photographing information setting value, and the compression characteristics of both circuits can be matched together by adjusting the elements (for example the resistance $R_{13}$) of the circuits. Also if a photo-conductive element having same temperature characteristics as that of the light receiving element 201 is used in stead of the resistance $R_{13}$, the temperature characteristics of both circuits can be matched and compensated. A constant current circuit is used in the differential amplification circuit to secure stabilized function.

Next the power source switches $S_3$, $S_5$ are closed in association with the shutter actuation and the regeneration circuit is actuated. Before that the change over switch SM is separated from "$a$" side then the mirror-up is done and said switch SM is changed over to "$b$" side in association with a shutter opening member. The voltage memorized in the condensor CM is impressed to the transistor $Q_{25}$ of the regeneration circuit, and the output resistance value of its output transistor $Q_{29}$ will become such value as corresponding to the memorized voltage. A control voltage is added to the regeneration circuit 210 from the control circuit consisting of transistor amplification circuit $Q_{21}$ through $Q_{24}$ having feedback paths, and the characteristics of the regeneration circuit is elongated by the compression characteristics of the control circuit, thereby the variation in the resistance by the light incident upon the photo-conductive element 201 will be precisely regenerated as the resistance value of the output transistor of the regeneration circuit. The transistor switching circuit is actuated using the delay time of the time constant circuit consisting of said resistance value and the condensor $C_2$.

Next the shutter speed control circuit will excite the output stage transistors $Q_{33}$ and $Q_{34}$ by the exciting stage of the differential amplifier consisting of the transistors $Q_{32}$ and $Q_{35}$, and the switching circuit consisting of the transistors $Q_{38}$, $Q_{39}$ is shifted by the output of the output stage and the retention of the shutter closing member which has been retained by the electro-magnet 214 is released to close the shutter. Also a stabilizing circuit consisting of the transistors $Q_{36}$, $Q_{37}$ and a constant current circuit with the transistors $Q_{30}$, $Q_{31}$ are provided to stabilize the function of the differential amplification circuit.

Flash Illumination Photographing:

When the flash photographing mark ($\eta$) on the dial $119_1$ is matched to the fixed mark, the change over switches $120_1$, $120_2$, $120_3$ are changed over to the positions shown respectively by solid lines in FIG. 6. The sensitivity of the film used is set at the variable resistance $R_{ASA}$ and the variable resistor 202 is adjusted corresponding to a distance to an object by the object distance setting ring. The distance information, ASA information are put into the operation circuit through the compression circuits 203, 206 and the $\gamma$ conversion circuit by the circuit shown in FIG. 6. And the result of the same is memorized in the memory condensor CM and at the same time indicated by the meter 118. Since the mark within the finder at that time is changed over to an indication part having the mark I for setting the diaphragm value, the preset diaphragm ring is rotated until the swing value of the meter 118 matches the mark thus appropriate preset value is obtained. At this time the voltage between terminals of the light emitting condensor $C_o$ of the flash emission device side circuit shown in FIG. 7 is divided by the bleeder resistances $RS_1$, $RS_2$ and its voltage at the bleeder point is impressed to the neon tube $N_1$. As the terminal voltage of the condensor $C_o$ reaches such voltage as allowing emission of light, the neon tube is lighted, and the transistors $T_{r5}$, $T_{r6}$ become ON by the current, putting the light on, then the brightness of the lamp $L_T$ will be different by the resistance between the emitter and the collector of the transistor $T_{r6}$. Because of this, the terminal voltage of the light emitting condensor $C_o$ will be impressed to the element $210_c$ through the lamp $L_T$.

Therefore the meter 118 will be corrected in its swing angle corresponding to the terminal voltage of the light emission condensor $C_o$, therefore such operation will be done by considering the amount of light emitted by the flashing device by the operation circuit. Therefore it is possible to make the diaphragm setting resistance RF variable so as to match it with the desired diaphragm value.

Next, as release is done, the switch $S_s$ is closed and by the ON of $SCR_1$, the xenon tube B flashes emitting light by the electric charge accumulated at the condenser $C_o$. The photo transistor $Q_p$ receives light reflected from an object, as a result charging is done at $C_{c2}$, and since the condensor $C_{c2}$ is not connected to the transistor $T_{r3}$, the $T_{r3}$ receives no effect at all and the total electric charge of the light emission condensor $C_o$ will be applied as flashing energy. On the other hand, as the finder mirror etc. are pushed up in an association with release, the switch SM is changed over from the solid line position to dotted line position, and since the switch $120_3$ is changed over to M side, the time limit circuit receives no effect of the electric charge of the memory condensor CM, then the shutter is opened and closed with such time constant time as determined by the resistance RS and the condensor $C_3$, wherein said opening and closing of the shutter is done a certain time such as 1/30 sec. etc.

While the circuit consisting of the photo transistor $Q_p$, transistors $T_{r3}$, $T_{r4}$, etc. in FIG. 7 shows a circuit to stop light emission of the flash at the time when the flash reflective light from an object is integrated and reaches to a predetermined value, explanation of the same is omitted here as it has no direct connection to the present invention.

As has been explained above, the present invention is to operate the exposure value by the operation circuit at the time of flash photographing and the result of the same is put into the memory device such as a memory device, etc. and the exposure diaphragm value is set based on its result, while in the case of ordinary photographing same memory device is used to set the expsoure, thus it is very effective for ordinary photographing as well as for flash photographing.

What is claimed is:

1. An exposure control for a photographic system having a shutter and a diaphragm as well as a focus control and a flash, comprising light sensitive means for producing a signal corresponding to the light on an object to be photographed, focus control signal means for producing a signal corresponding to the setting of the focus control, diaphragm signal means for producing a signal corresponding to the diaphragm opening, a shutter regulating circuit for regulating the shutter speed, indicating means, flash power signal means for producing a signal corresponding to the power of the flash, and control means selectively operable in an available light mode and in a flash mode and coupled to said diaphragm signal means and said light sensitive means as well as said flash power signal means and said indicating means as well as said focus control signal means and said shutter regulating circuit for constraining said shutter regulating circuit to cause the shutter to operate at a speed in response to the light sensitive means and said diaphragm signal means in the available-light mode, and for constraining said shutter regulating circuit to operate the shutter at a predetermined speed period while causing said indicating means to produce an indication corresponding to the flash power signal means and the focusing arrangement in the flash mode so that the diaphragm can be operated on the basis of the indicating means.

2. A device as in claim 1, wherein said indicating means includes means for setting the diaphragm to the desired opening determined by said indicating means.

3. An exposure setting device for a photographic system with a shutter and a diaphragm as well as a focus arrangement and a flash device, comprising a light receiving element for receiving light from an object and producing a signal corresponding to the light received, variable resistance means coupled to the focusing arrangement for producing a signal corresponding to the distance to an object being photographed, setting means coupled to the diaphragm for producing a signal corresponding to the diaphragm setting, detecting means for producing a signal corresponding to the power of the flash device, first operating circuit means responsive to said detecting means and the variable resistance means, second operating circuit means coupled to said setting means and alternately connectable with said light receiving element and said first operating circuit means for producing a value corresponding to the combined inputs, memory means connected to said second operating circuit means for storing the value, exposure indicating means connected to said second operating circuit means, timing circuit means for operating the shutter, and control means establishing a first mode for constraining said second operating circuit means to respond to said light receiving element and said timing circuit means to operate the shutter at a speed determined by the value in said memory means and establishing a flash mode for causing said second operating circuit means to respond to said first operating circuit means and constraining said timing means to operate the shutter at a predetermined speed while the diaphragm is set at an opening corresponding to that indicated by said indicating means.

4. The device according to claim 3, which is characterized by that the above mentioned memory means is a condensor or condensors.

5. A device as in claim 3, wherein said indicating means includes a scale having a series of shutter time readings and a second scale having a series of diaphragm readings as well as an indicator and a viewfinder, one of said scales being shiftable for changing the diaphragm opening.

6. A device as in claim 3, wherein said indicating means includes a scale having a series of shutter time readings and a fixed mark as well as a finder, said mark and said scale being shiftable relative to each other within the finder.

7. A device as in claim 3, wherein said second operating circuit means includes a compression circuit alternately responsive to said light receiving element and said variable resistance means for compressing the signals thereof.

8. A device as in claim 3, wherein said second operating circuit means includes a first compression circuit alternately responsive to light receiving means and said variable resistance means so as to compress their respective outputs logarithmically, a second compression circuit responsive to said setting means for compressing the signal from said setting means logarithmically, and a comparator circuit responsive to the outputs of first and second compression circuits.

9. A device as in claim 8, wherein said setting means further includes means for producing a signal corresponding to the film sensitivity.

10. A device as in claim 3 wherein said setting means further includes means for producing a signal corresponding to the film sensitivity.

11. A device as in claim 3, wherein said detecting means detects the voltage of a main capacitor in the flash device so as to produce a signal corresponding to the guide number.

12. A device as in claim 3, wherein said indicating means comprises a scanning mechanism which rotates the diaphragm ring in accordance with its instructions so as to set the diaphragm value automatically during operation in the flash mode.

* * * * *